US010357777B2

(12) United States Patent
Shumka et al.

(10) Patent No.: US 10,357,777 B2
(45) Date of Patent: *Jul. 23, 2019

(54) SYSTEM AND METHOD FOR MEASURING A CLOSED-SIDE AND/OR OPEN-SIDE SETTING OF A GYRATORY CRUSHER

(71) Applicant: CRUSHER VISION, INC., Kelowna (CA)

(72) Inventors: Thomas Shumka, Kelowna (CA); Jason Shumka, Kelowna (CA)

(73) Assignee: CRUSHER VISION, INC. (CA)

(*) Notice: Subject to any disclaimer, the term of this patent is extended or adjusted under 35 U.S.C. 154(b) by 157 days.

This patent is subject to a terminal disclaimer.

(21) Appl. No.: 15/645,948

(22) Filed: Jul. 10, 2017

(65) Prior Publication Data
US 2017/0304844 A1  Oct. 26, 2017

Related U.S. Application Data

(63) Continuation-in-part of application No. 15/300,323, filed as application No. PCT/IB2015/052349 on Mar. 31, 2015, now Pat. No. 9,700,898.

(60) Provisional application No. 61/972,474, filed on Mar. 31, 2014.

(51) Int. Cl.
*B02C 25/00* (2006.01)
*B02C 2/04* (2006.01)
*G01B 11/02* (2006.01)
*G01B 11/14* (2006.01)

(52) U.S. Cl.
CPC ............... *B02C 25/00* (2013.01); *B02C 2/04* (2013.01); *G01B 11/02* (2013.01); *G01B 11/14* (2013.01)

(58) Field of Classification Search
CPC .. B02C 25/00; B02C 1/02; B02C 2/06; G01B 11/14; G01B 11/02
See application file for complete search history.

(56) References Cited

U.S. PATENT DOCUMENTS

| 7,647,200 | B2 * | 1/2010 | Loyer ...................... B02C 2/06 241/30 |
| 7,815,133 | B2 | 10/2010 | Bielotserkovsky |
| 9,084,998 | B2 * | 7/2015 | Belotserkovskiy ....... B02C 2/04 |

(Continued)

OTHER PUBLICATIONS

International Search Report dated Jul. 21, 2015 in PCT/IB2015/052349, filed Mar. 31, 2015 (3 pages).

(Continued)

*Primary Examiner* — Faye Francis
(74) *Attorney, Agent, or Firm* — Baumgartner Patent Law; Marc Baumgartner

(57) ABSTRACT

A gyratory crusher and system for determining a close-side setting or an open-side setting is provided including a point cloud generator mounted proximate the crusher; a drone; a laser emitter mounted on the drone to mark the first trace on the mantle at a predetermined position of the gap; a camera mounted on the drone to capture a series of image of the first trace as the mantle of the gyratory crusher rotates; and a computer in communication with the camera, the point cloud generator and the drone, the computer comprising a memory and a processor, the memory providing instructions to process the image to provide a gap width and to determine at least one of a close-side setting or an open-side setting from the gap width.

19 Claims, 11 Drawing Sheets

(56) References Cited

U.S. PATENT DOCUMENTS

| | | | |
|---|---|---|---|
| 9,700,898 B1* | 7/2017 | Shumka | B02C 2/06 |
| 2012/0217357 A1* | 8/2012 | Franke | B02C 2/005 |
| | | | 248/163.1 |
| 2016/0250642 A1* | 9/2016 | Lindstrom | B02C 1/02 |
| | | | 241/25 |

OTHER PUBLICATIONS

Written Opinion dated Jul. 21, 2015 in PCT/IB2015/052349, filed Mar. 31, 2015 (3 pages).

* cited by examiner

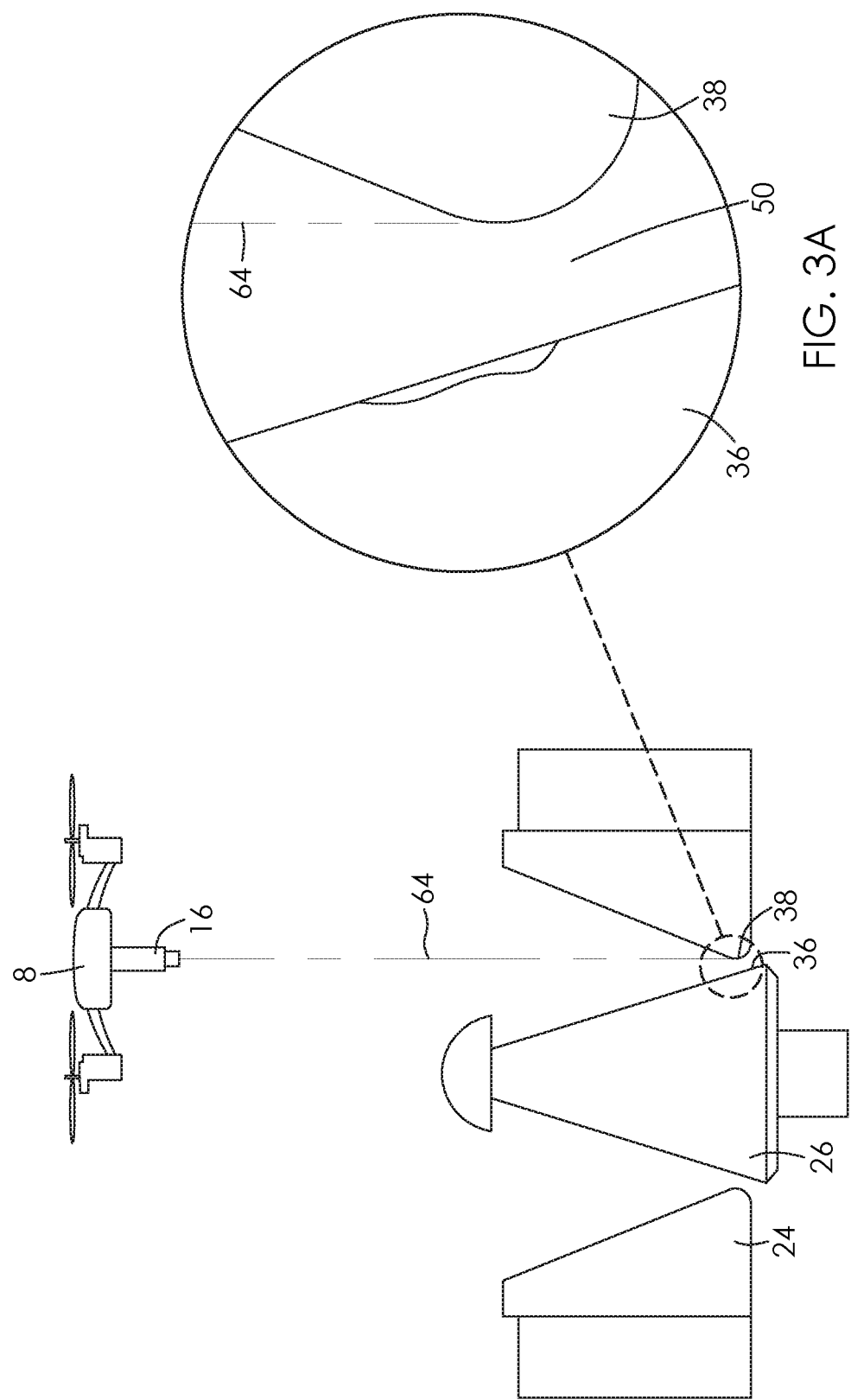

SYSTEM AND METHOD FOR MEASURING A CLOSED-SIDE AND/OR OPEN-SIDE SETTING OF A GYRATORY CRUSHER

CROSS REFERENCE TO RELATED APPLICATIONS

This application is a continuation-in-part of U.S. patent application Ser. No. 15/300,323, filed Sep. 29, 2016, which is a U.S. national phase application of International Patent Application No. PCT/IB2015/052349, filed Mar. 31, 2015, which claims the benefit of U.S. Provisional Application No. 61/972,474, filed Mar. 31, 2014. The above-identified priority patent applications are incorporated herein by reference in their entirety.

FIELD OF THE INVENTION

The present technology is directed at a system and method for measuring a gap width of a gyratory crusher between the mantle and concave to determine wear. More specifically, the technology measures the gap at an endpoint of the eccentric rotation to provide a setting which is indicative of wear. Significantly, this can be accomplished when the crusher is operating, but empty, allowing an operator to obtain results within a few minutes or less.

The system allows the client to accurately schedule mantle and concave changeouts, based on wear rates, rather than on a fixed schedule, extending the service life of crusher components.

BACKGROUND OF THE INVENTION

Crushers are commonly used in the mining and minerals processing industry in order to break down large solid materials into smaller pieces for further processing or transport. Some examples of crushers include jaw crushers, cone crushers, cylindrical roll crushers, and gyratory crushers. Large pieces of material are typically broken down in a crusher through a moving component which drives the material against a stationary component with sufficient force to fracture and fragment the material to smaller, more manageable pieces. One type of crusher is a gyratory crusher which comprises a moving mantle and a stationary concave. Each of the mantle and concave are covered by liners. The mantle moves on an eccentric in a circular orbit within the concave, causing an annular gap at each radial location inside the crusher to narrow and widen as the mantle moves around its orbit. The narrowest gap between the mantle liner and the concave liner is known as the closed-side setting (CSS). The widest gap between the mantle liner and the concave liner is known as the open-side setting (OSS).

Operators of gyratory crushers try to maintain the CSS at a constant value to ensure efficient and predictable operation. Due to the frictional wear and tear on the concave liner and the mantle liner from the crushing operation, the CSS will get larger over time, and adjustments must be periodically made to ensure a constant CSS is maintained. It is critical to know the crusher gap width as it relates to the CSS to ensure the crushed product size is optimum for the mill feed.

Adjustments may be made by varying the position of the mantle (usually in the vertical direction) relative to each other, or the concave liner and/or the mantle liner may be replaced when excessively worn and adjustment is no longer feasible. Disadvantageously, known methods for measuring the CSS requires the operator to lower a lead ball attached to rope into the crusher chamber/pocket. Usually it is placed on the ore inside the crusher pocket. As the ore goes through the crusher the lead ball gets "squished" and the operator raises the lead ball back up so they can manually measure the width of the lead ball. This is the measurement they use to determine the mantle position, allowing for determination of the wear on the mantle from the previous adjustment. Also, the manual measurement presents certain safety concerns, as a person must be brought into the vicinity of the crusher while becoming exposed to crushed rock, dust, and debris. In another method, mantle wear is measured with 3-dimensional laser imaging. This requires shutting down the crusher and the use of an overhead crane for the imaging.

One system for measuring CSS is disclosed in US Publication No. 20130231892. It is for measuring the displacement of a surface in a material handling system relative to a base reference. The system includes scanning means to generate point cloud data of the surface relative to a reference point to define a three-dimensional image of the surface, storage means to store base reference data in respect of the base reference, and processing means to process the point cloud data and the base reference data to determine the relative displacement of the surface with respect to the base reference. The processing means includes a referencing means to orientate the point cloud data relative to key reference data of the base surface and transforming the point cloud data and the base reference data into a common co-ordinate system, and displacement processing means to calculate the displacement between the surface and the base reference using both sets of data in the co-ordinate system. In this way, it maps the surface of the parts of interest. This system has been determined to be very expensive and overly complex. Further, the crusher or mill must be stopped and decontaminated before scanning can be done. The scanner is then positioned in the mill or crusher using an overhead crane, the scans are done to provide data and then the scanner is removed. The data are then analyzed to provide a three-dimensional map. The scanner then needs to be removed before operations can start again. Accordingly, this is a disruptive process that results in significant down time.

What is needed is a safe, quick method for determining CSS or OSS. Preferably, this could be done without shutting the crusher down. Preferably, calibration would be done quickly and safely, without the need for a worker to unsafely drop a lead ball into the crusher chamber and pull it out again. A system to allow such a method is therefore also needed. It would be preferably if the laser emitter and camera could be mounted in a location that is not subject to vibration.

SUMMARY OF THE INVENTION

The present technology provides a system for determining CSS in a gyratory crusher by measuring the gap width. The camera is mounted on a drone to remove interference from vibration. A calibration three-dimensional laser emitter is used to generate point cloud data, which is used to calibrate the laser emitter each time the mantle, concave, mantle liner or concave liner are changed. The laser emitter is mounted on a permanent structure. A positioning three-dimensional laser can be used to position the drone with a high degree of accuracy, which necessary when there is not a clear line of sight to a GNSS satellite. In locations where there is a clear sight line to GNSS satellites, an RTK base station can be used to position the drone, again, with a high degree of accuracy. The determination can be completed in less than five minutes and does not require that the crusher be shut down. Measurements are taken while the crusher mantle continues to rotate. The system allows personnel to obtain the data risk free and provides much quicker results than past practice. The daily reading helps predict the mantle life and also allows for maximization of the mantle life. With accurate data a mine can trend the mantle daily and plan mantle change outs with accuracy. The technology also provides the benefit of keeping the target crush size constant. This helps with mill throughput, increasing production.

The mantle life is predicted to be extended using this technology because it assists the choke feeding, and choke feeding reduces mantle wear.

Another advantage is that when the technology is utilized daily, the crusher tonnage and production quality is maintained—incorrect settings result in either reduced tonnage or materials that are too coarse.

In one embodiment, a system for determining a close-side setting or an open-side setting for a gyratory crusher is provided, wherein the gyratory crusher comprises an eccentrically rotatable mantle lined with a mantle liner, a concave lined with a concave liner, the concave housing the mantle to provide a crusher chamber, the crusher chamber having a gap, the system comprising: a laser emitter, the laser emitter positioned to mark a laser trace traversing the gap and at least intersecting the concave liner at a predetermined rotational position of the mantle to provide an offset at the outer edge of the concave liner and a second offset for identifying an outer edge of the concave liner; a drone; a camera mounted on the drone, the camera to capture an at least one image of the laser trace and an outer edge of the concave liner at the predetermined rotational position of the mantle at the gap; a positioner, which is either a Real Time Kinematic (RTK) base station for communication with a satellite or is a first point cloud generator; a second point cloud generator for placement in the crusher chamber to generate a point cloud of the gap for calibrating the laser emitter; a computer in communication with the camera, the drone, the second point cloud generator and the first point cloud generator or the RTK base station, the computer comprising a memory and a processor, the memory providing instructions to the processor to process the position of the drone and to send instructions to the drone to correctly position the drone, the processor to process the image to provide a gap width and to calculate at least one of the close-side setting and the open-side setting from the gap width.

The system may further comprise a calibration plate for placement in the crusher chamber.

In the system, the camera may be configured to capture a series of images as the mantle rotates.

In the system, the point cloud generator may be mounted proximate the crusher to generate a point cloud of the gap for calibrating the laser emitter.

In the system, the memory may store calibration data.

In the system, the memory may provide instructions for the processor to determine wear based on the gap width.

In the system, the RTK base station may be for correctly positioning the drone.

In another embodiment, a method of determining a close-side setting or an open-side setting for a gyratory crusher by measuring a gap width is provided, wherein the gyratory crusher comprises an eccentrically rotatable mantle lined with a mantle liner, a concave lined with a concave liner, the concave housing the mantle to provide a crusher chamber, an outer edge of the concave liner and an outer edge of the mantle liner defining a gap, the method comprising the steps of: (i) positioning a laser emitter such that it is aligned to mark a laser trace traversing the gap and intersecting the concave liner at a predetermined rotational position of the mantle to provide an offset at the outer edge of the concave liner and a second offset for identifying an outer edge of the concave liner; (ii) determining a position of a drone carrying a machine vision system; and (iii) using the machine vision system that has been calibrated: capturing an image of the laser trace at the gap at the selected rotational position of the mantle; processing the image; measuring a distance between the outer edge of the mantle liner and the outer edge of the concave liner to provide a gap width; and calculating the closed-side setting or the open-side setting, thereby determining at least one of the close-side setting and the open-side setting.

In the method, a first point cloud generator may determine the position of the drone and, in communication with a computer, correctly positions the drone.

The method may further comprise changing one or more of the mantle and the concave.

The method may further comprise calibrating the machine vision system using a second point cloud generator to provide a point cloud of the mantle liner and the concave liner at the gap.

The method may further comprise the step of positioning the laser emitter such that a second trace traverses the gap and at least intersects the concave liner at the selected position of the gap to provide a first offset in the second trace for identifying an outer edge of the mantle liner and a second offset for identifying an outer edge of the concave liner.

In the method, the mantle may be rotating as the camera is capturing images.

In the method, the method is completed in about five minutes.

In the method, the selected rotational position providing the gap may be at a closed-side setting.

In the method, the selected rotational position providing the gap may be at an open-side setting, the method including calculating the close-side setting from the gap width at the open-side setting.

In the method a point cloud generator may be in communication with a computing device to determine the position of the drone and correctly positions the drone.

In yet another embodiment, gyratory crusher combination is provided, the gyratory crusher combination comprising: a gyratory crusher, the gyratory crusher including an eccentrically rotating mantle lined with a mantle liner, a concave lined with a concave liner, the concave housing the mantle to provide a crusher chamber, and the crusher chamber having a gap; and a system for determining a close-side setting or an open-side setting for the gyratory crusher including: a first point cloud generator proximate the crusher; a laser emitter, the laser emitter positioned to mark a laser trace traversing the gap and at least intersecting the concave liner at a predetermined rotational position of the mantle to provide an offset at the outer edge of the concave liner and a second offset for identifying an outer edge of the concave liner; a drone; a camera mounted on the drone to capture a series of image of the laser trace as the mantle of the gyratory crusher rotates; and a computer in communication with the camera, the first point cloud generator and the drone, the computer comprising a memory and a processor, the memory providing instructions to the processor to process the position of the drone, to send instructions to the drone to correctly position the drone, to process the image to provide a gap width and to determine at least one of a close-side setting or an open-side setting from the gap width.

In the gyratory crusher combination the laser emitter may be a cross hair laser for emitting the laser trace and a second laser trace, the laser emitter mounted to mark the second laser trace bisecting the mantle at the predetermined position of the gap.

In the gyratory crusher combination, the predetermined position of the gap may be at the close-side setting.

In the gyratory crusher combination, the second point cloud generator is positioned to provide a point cloud of at least a portion of the mantle lining and the concave lining at the gap for calibrating the camera.

In yet another embodiment, a system for determining a close-side setting or an open-side setting for a jaw crusher is provided, wherein the jaw crusher comprises a first jaw plate on a first side and a second jaw plate on a pivoting jaw to provide a crusher chamber, the crusher chamber having a gap, the system comprising: a point cloud generator mounted proximate the crusher; a laser emitter, the laser emitter mounted to mark a laser trace traversing the gap at a predetermined position of the pivoting jaw; a drone; a camera mounted on the drone to capture an at least one image of the laser trace at the predetermined position of the pivoting jaw; and a computer in communication with the camera, the point cloud generator and the drone, the computer comprising a memory and a processor, the memory providing instructions to the processor to process the position of the drone, to send instructions to the drone to correctly position the drone, to process the image to provide a gap width and to determine at least one of a close-side setting or an open-side setting from the gap width.

In yet another embodiment, a system for determining a close-side setting or an open-side setting for a gyratory crusher is provided, wherein the gyratory crusher comprises an eccentrically rotatable mantle lined with a mantle liner, a concave lined with a concave liner, the concave housing the mantle to provide a crusher chamber, the crusher chamber having a gap, the system comprising: a laser emitter, the laser emitter positioned to provide an image of one or more of the concave liner and the mantle liner; a drone; a camera mounted on the drone, the camera to capture the image; a positioner, which is either a Real Time Kinematic (RTK) base station for communication with a satellite or is a first point cloud generator; a computer in communication with the camera, the drone, and the first point cloud generator or the RTK base station, the computer comprising a memory and a processor, the memory providing instructions to the processor to process the position of the drone and to send instructions to the drone to correctly position the drone, the processor to process the image and to calculate at least one of the close-side setting and the open-side setting from the gap width.

BRIEF DESCRIPTION OF THE DRAWINGS

In the accompanying drawings, which illustrate one or more exemplary embodiments:

FIG. 2A shows the closed position.

FIG. 3 is a schematic elevation view illustrating a laser emitter of the system emitting a laser light trace onto the mantle and concave and a camera located to capture an image of the laser trace. FIG. 3A is a close up of FIG. 3.

DESCRIPTION

Figure 1:
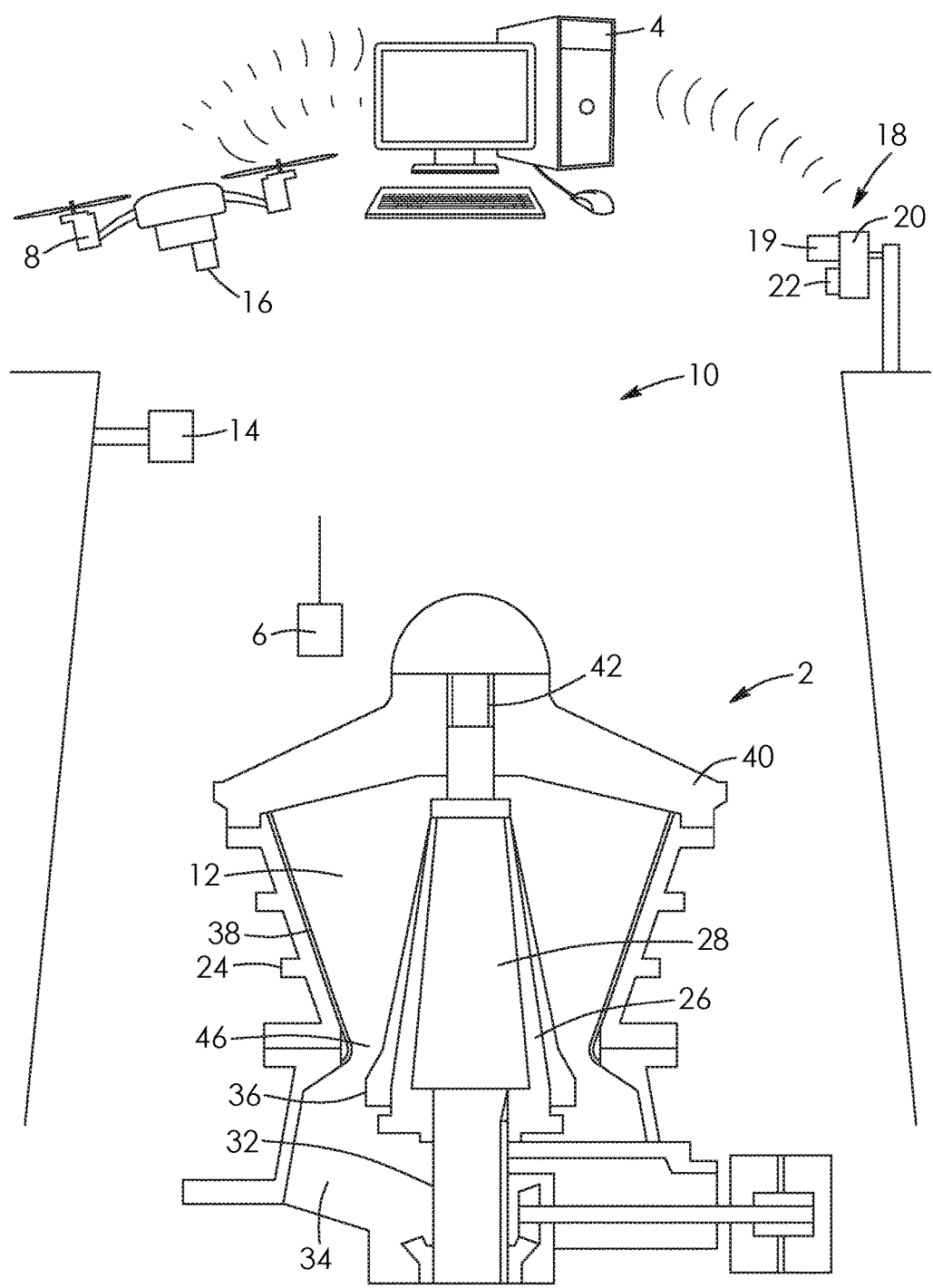
FIG. 1 is a schematic sectional view of a gyratory crusher and a system for determining a closed side setting of the gyratory crusher according to one embodiment.

Directional terms such as "front", "rear", "top", "bottom", "upper", "lower", "downwards", "vertically", "laterally", or similar, are used in the following description for the purpose of providing relative reference only, and are not intended to suggest any limitations on how any article is to be positioned during use, or to be mounted in an assembly or relative to an environment.

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions:

Camera—in the context of the present technology, a camera is any device that can accurately capture an image or images of a laser trace.

Machine vision—in the context of the present technology, machine vision is provided by one or more pieces of equipment that allow for an image captured and analyzed to provide an output. In the preferred embodiment, this is an imager such as a camera, and a computer with a processor and memory.

Outer edge—in the context of the present technology, the outer edge is the edge of the mantle liner or the concave liner that faces the crushing chamber.

Edge—in the context of the present technology, an edge is where the mantle abuts the mantle liner or the concave abuts the concave liner.

Bisecting the mantle—in the context of the present technology, bisecting the mantle means that the trace crosses at least the mantle outer edge at two points along the trace line to provide a line bisecting the mantle liner or the mantle liner and mantle.

Laser emitter—in the context of the present technology, a laser emitter is a single laser emitter, or a cross hair laser emitter.

Drone—in the context of the present technology, a drone is an unmanned aerial vehicle (UAV).

Scanning laser emitter—in the context of the present technology, a scanner laser emitter is a three-dimensional laser emitter.

Point cloud—in the context of the present technology, a point cloud is set of data points that are used to define a three-dimensional surface. A point cloud is generated using a scanning laser emitter to map the surface.

Point cloud data generator—in the context of the present technology, a point cloud data generator is a scanning laser emitter with a detector and a processor.

Global Navigation Satellite System (GNSS)—in the context of the present technology, GNSS is the generic term that includes Global Positioning System (GPS) and other satellite navigation systems that provide autonomous geo-spatial positioning with global coverage.

Real Time Kinematics (RTK)—in the context of the present technology, RTK is a differential Global Navigation Satellite System. An RTK base station is required.

DETAILED DESCRIPTION

Embodiments of the invention described herein relate to a system and a method for measuring the closed side setting of (CSS) of a gyratory crusher by marking a mantle liner of the gyratory crusher with a crosshair laser light to indicate a mantle liner endpoint of the CSS applying image processing techniques to determine a concave liner endpoint of the CSS ("concave end"), and then calculating the distance between the concave liner and mantle liner endpoints to determine the CSS gap.

In an alternative embodiment, relate to a system and a method for measuring the open-side setting of (OSS) of a gyratory crusher by marking a mantle liner of the gyratory crusher with a crosshair laser light to indicate a mantle liner endpoint of the OSS, applying image processing techniques to determine a concave liner endpoint of the OSS ("concave end"), and then calculating the distance between the concave liner and mantle liner endpoints to determine the OSS gap.

In an alternative embodiment, the CSS is determined by marking a mantle liner of the gyratory crusher with a crosshair laser light to indicate a mantle liner endpoint of the open side setting (OSS), taking an overhead image of the marked mantle liner and a concave liner of the crusher, applying image processing techniques to determine a concave liner endpoint of the OSS ("concave end"), and then calculating the distance between the concave liner and mantle liner endpoints to determine the OSS gap. Then, using the OSS gap, calculating the CSS.

It is expected that these embodiments will provide a means for quickly and efficiently measuring the CSS in a crusher with minimal loss of downtime. The system enables the gap at CSS, the gap at OSS or the gap at any predetermined point in the rotation to be monitored and measured during crusher operation without having to remove any components to access the mantle or the concave, and without requiring a person to manually perform the measurements. It is expected that using any of these positions of the mantle relative to the concave as the position to measure the gap width will provide an efficient means of determining CSS to determine whether adjustments to the mantle or concave are necessary, or whether a concave and/or a mantle require replacement, and enable an operator to perform maintenance only when necessary thus avoiding premature servicing and unnecessary downtime of the crusher.

Referring to FIG. 1 and according to one embodiment, a machine vision system, generally referred to as 10, for determining the CSS of a gyratory crusher, generally referred to as 2 comprises a computer 4 and an imager 16 in communication with the computer 4 and mounted on a drone 8, which can fly above a gyratory crusher 2 such that an imager faces the inside of the gyratory crusher 2 and captures images of a crushing chamber 12 inside the gyratory crusher 2. In the preferred embodiment the imager is a camera 16. A laser emitter 14 is mounted on a structure on or proximate the crusher 2. The laser emitter 14 is preferably a cross hair laser emitter or a three-dimensional laser emitter or a line laser with a fan angle, which, for example could be a 5 degree fan angle. The laser emitter 14 provides a laser trace. Additionally, there is a first point cloud generator 18, which includes a scanning laser emitter 19, a point cloud detector 20, and a point cloud processor 22. The first point cloud generator 18 is mounted on top of a control room of the gyratory crusher 2; however, the first point cloud generator 18 can be mounted on any structure such as scaffold or pole that locates it in a suitable position to locate the drone 8. A second point cloud generator 6 is used for calibration and is lowered into the crushing chamber 12 when the mantle and/or concave is changed. It also includes a scanning laser emitter, a point cloud detector and a point cloud processor.

As shown in FIG. 1, the gyratory crusher 2 comprises a stationary concave 24 and a rotating mantle 26. The concave 24 comprises an upwardly-expanding frusto-conical shell and the mantle 26 comprises a downwardly expanding frusto-conical shell that is mounted on an eccentrically rotatable spindle 28 such that the mantle 26 protrudes upwards inside the concave 24. The spindle 28 is mounted to an eccentric sleeve 32 which causes the spindle 28 and mantle 26 to move around a circular orbit around the axis of the concave 24. The annular space between the concave 24 and the mantle 26 defines the crushing chamber 12 in which material is crushed; a discharge outlet 34 is communicative with the crushing chamber 12 to discharge crushed material from the gyratory crusher 12. The inside surface of the concave 24 is covered by a concave liner 36 to protect the concave 24 from damage and/or wear. The outside surface of the mantle 26 is covered by a mantle liner 38 to protect the mantle 26 against wear and/or damage. A spider assembly 40 is secured to the top of the concave 24 to cover the crushing chamber 12 and prevent the entry of errant debris. The spider assembly 40 comprises a bearing assembly 42 to rotatably receive an end of the spindle 28, and inlets (not shown) through which material is deposited into the crushing chamber 12 for crushing. In operation, material is deposited through the inlet of the spider assembly 40 and into the crushing chamber 12, where it becomes wedged between the concave 24 and the mantle 26. As the mantle 26 travels around its circular orbit, material near the bottom portion 46 of the crushing chamber 12 will be crushed by the closing of the crushing chamber 12 between the moving mantle liner 36 and the stationary concave liner 38. Conversely, the opening of the bottom portion 46 of the chamber 12 between the moving mantle liner 36 and the stationary concave liner 38 will allow crushed material to exit the gyratory crusher 2 via the discharge outlet 34.

Figure 2A:
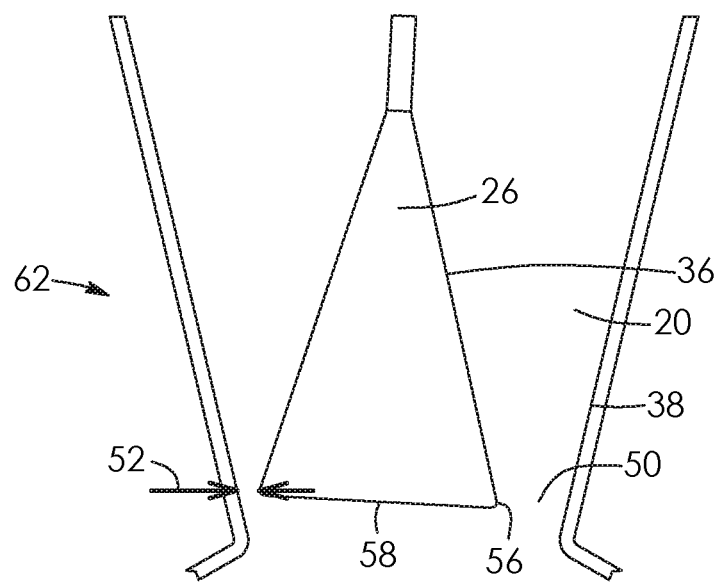
FIGS. 2A and B are schematic sectional views of the gap in the gyratory crusher as it moves between the open position and the closed position.
Figure 2B:
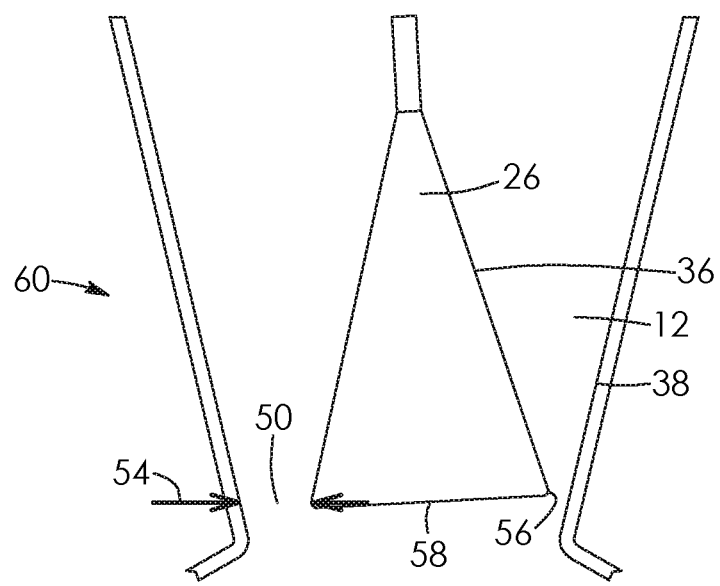
FIG. 2B shows the open position.

Referring to FIGS. 2A and 2B, the horizontal distance between the mantle liner 36 and the concave liner 38 at a gap 50 defines a closed-side setting (CSS) 52 and an open-side setting (OSS) 54. The gap 50 is adjacent the wear region 56 of the mantle liner 36, which is approximately 36 inches wide and starts about 6 inches from the bottom 58 of the mantle 26. The location of the gap 50 to be measured is determined by the location that the mantle liner 36 has been scanned by the calibration three-dimensional laser 6. This is most preferably at the narrowest part of the crushing chamber 12. As the rotation of the mantle 26 is eccentric the gap 50 moves between an open position, generally referred to as 60 (left side of FIG. 2B), which is where the OSS 54 is measured and a closed position, generally referred to as 62 (left side of FIG. 2A), which is where the CSS 52 is measured. Hence the CSS 52 is the shortest distance between the liners 36, 38 and the OSS 54 is the greatest distance between the liners 36, 38 throughout the throw of the mantle 26.

As shown in FIGS. 3 and 3A, the drone 8 is positioned above the gap 50 such that the camera 16 is in line of sight 64 with the mantle liner 36 and concave liner 38 when the mantle 26 and the concave 24 are either at the stage of rotation where they are the closest to one another (the gap 50 is at its smallest), or are at their greatest distance apart or alternatively, at a preselected point in the rotation other than at the extremes.

Figure 4:
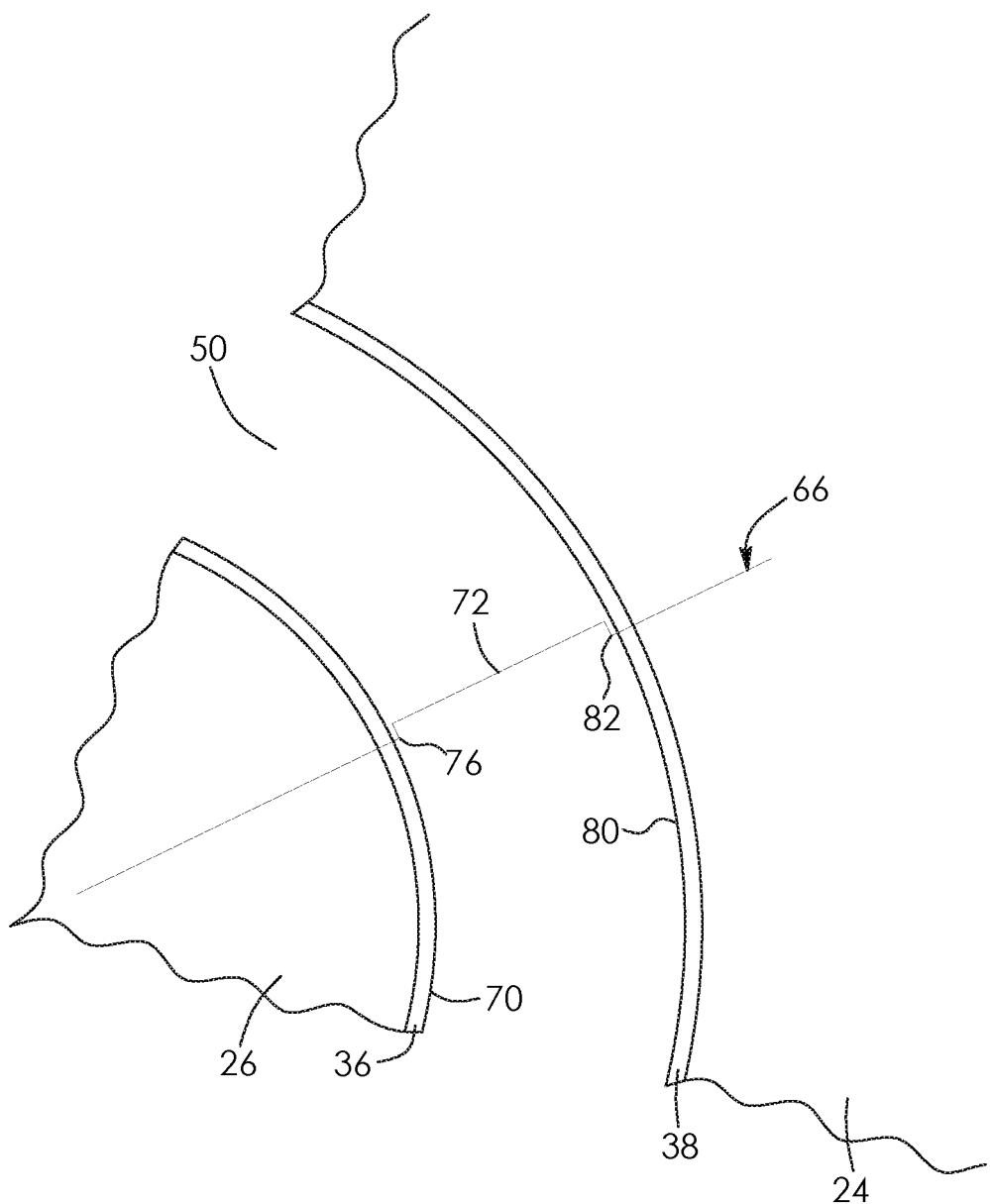
FIG. 4 is a schematic cross-sectional view of the laser light trace across the mantle, gap and concave taken by the camera of the system.

As shown in FIG. 4, the laser emitter 14 is positioned such that a laser trace 72 traverses the gap 50 between the mantle liner 36 and the concave liner 38, extending over the concave liner 38 at the either the closed position 62 or at the open position 60. Where it crosses the outer edge 70 of the mantle liner 36, there is a first offset 76 in the second trace 78. Similarly, where it crosses the outer edge 80 of the concave liner 38, there is a second offset 82 in the second trace 78. This clearly indicates the location of the outer edge 70, 80 of the mantle liner 36 and the concave liner 38, respectively.

Figure 5:
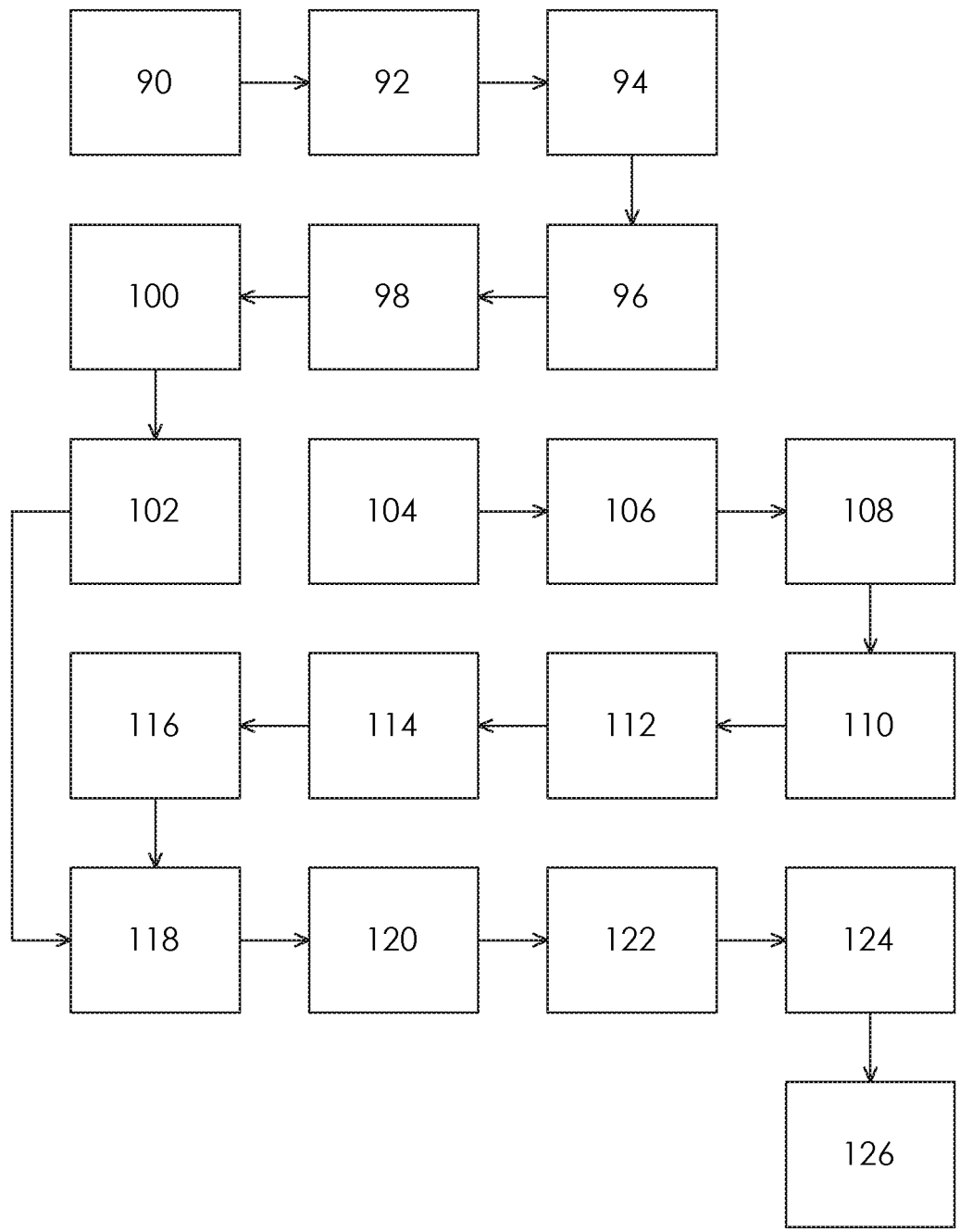
FIG. 5 is a flow chart of the method of collecting point cloud data and calibrating the laser emitter.

As shown in FIG. 5, the laser emitter 14 must be calibrated and a computer program must be provided with calibration data. The laser emitter 14 calibration procedure occurs when at least one of the concave 24 and the mantle 26 are replaced 102 in the crusher 2. It only needs to be done at this time and done once. The second point cloud generator 6 is lowered into the chamber scans 90 the mantle liner 36 and the concave liner 38 at the lowest part of the concave 24, which is the narrowest gap. The point cloud detector detects 92 the reflected laser light and the processor generates 94 the three-dimensional image of the mantle liner 36, the concave liner 38, the gap 50 and a calibration plate which is positioned in the gap 50. The image is relayed 96 to the computer 4. The computer 4, which comprises a processor and a memory having encoded thereon program code that when executed by the computer 4 processes 98 the point cloud image to provide 100 the "original mantle endpoint position" and "original concave endpoint position". These data points are stored 102.

The laser emitter 14 is activated 104 and positioned 106 at the gap 50, preferably, but not necessarily at the narrowest point of the gap 50. In the closed position 62 or in the open position 60, the laser trace 78 traverses 112 the gap 50 between the mantle liner 36 and the concave liner 38, extending over the concave liner 38. The camera 16 is positioned 114 to have a line of sight to the cross hair 66. The camera 16 then takes 116 an image ("calibration image") which is compared 118 by the computer with the point cloud data (again with the calibration plate in position) and the endpoints are located 120 in the image and their pixel position in the image is stored 122 in the computer program ("original mantle endpoint pixel position" and "original concave endpoint pixel position"). Then, the pixel distance between the end points in the image is then calculated 124 and a conversion ratio of pixel distance to the actual CSS or OSS (as determined by the point cloud data) is determined 126.

Figure 6:
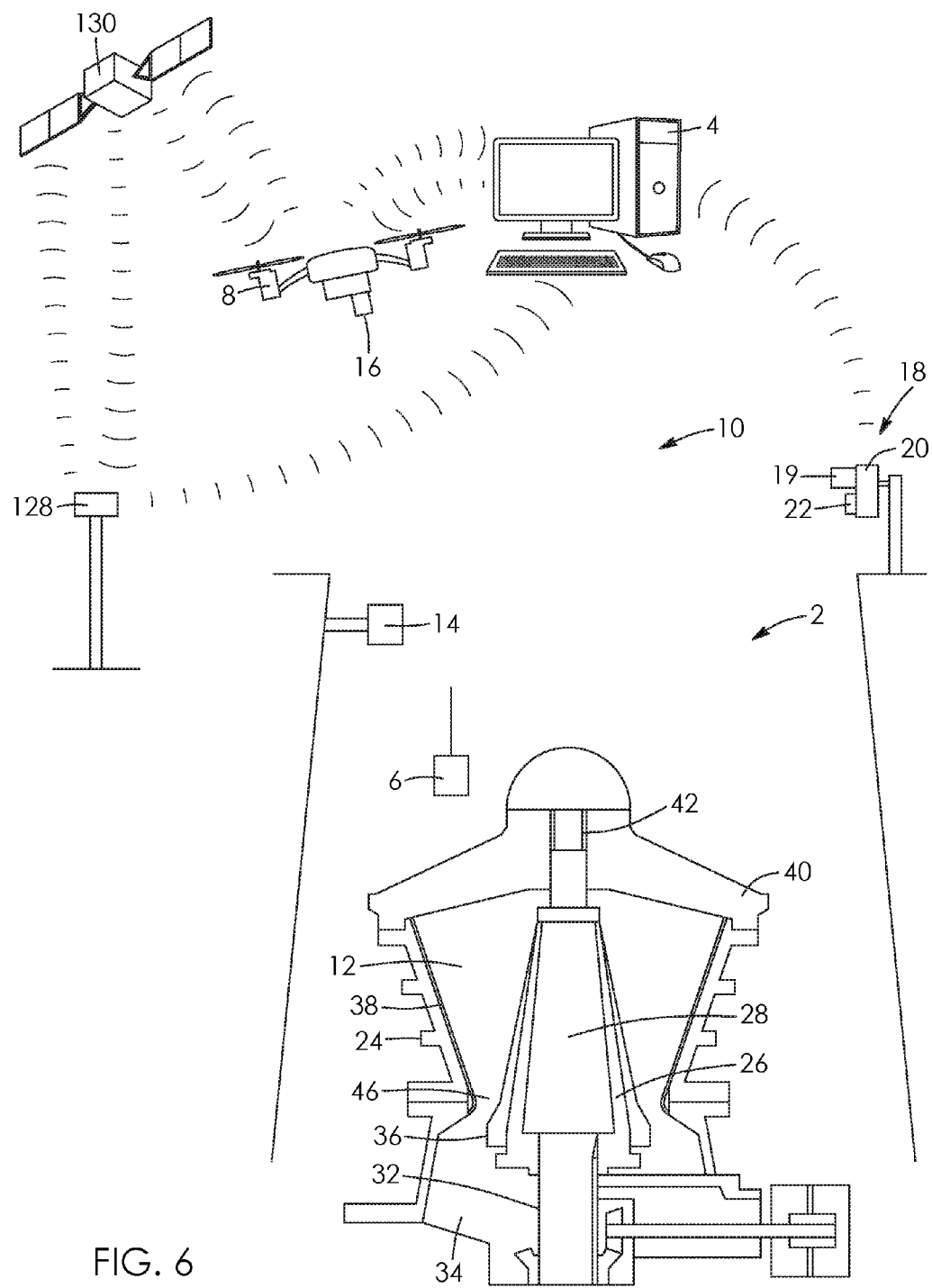
FIG. 6 is a schematic sectional view of a gyratory crusher and a system for determining a closed side setting of the gyratory crusher according to one embodiment.

As shown in FIG. 6, in one embodiment, the system 10 includes an RTK base station 128 that communicates with any GNSS satellites 130 that are in line of sight and with the computer 4. The drone communicates with any GNSS satellites 130 that are in line of sight and with the computer 4 to obtain accurate position information.

Figure 7:
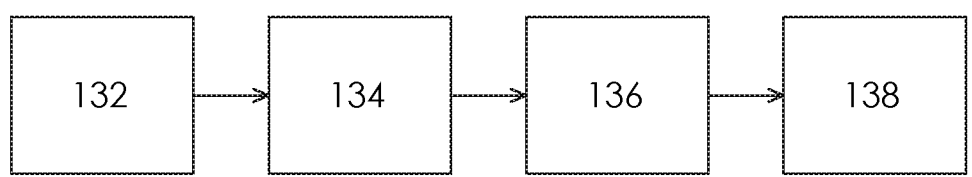
FIG. 7 is a flow chart of the method of positioning the drone in flight.

As shown in FIG. 7, in one embodiment, the second point cloud generator 6 is used for calibration and RTK is used for ensuring that the drone 8 is in the correct location. The laser emitter 14 is calibrated as in FIG. 5 above. The drone communicates 132 with the satellite. The RTK base station communicates 134 with the satellite 130 and the computer 4. The computer corrects 136 the GNSS position data from the drone 8 and instructs 138 the drone 8 to move into the position determined during calibration.

Figure 8:
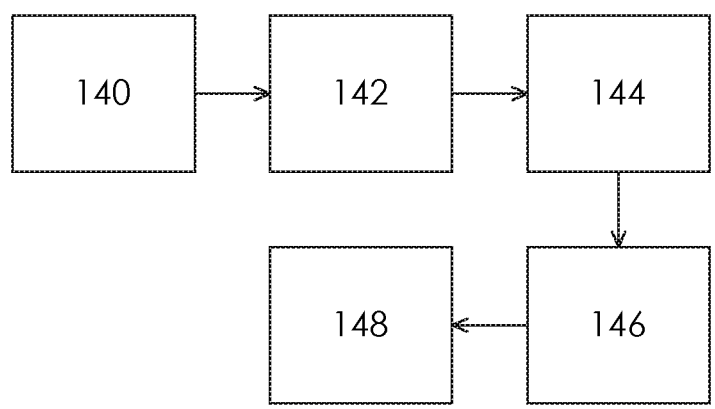
FIG. 8 is a flow chart of an alternative method of positioning the drone in flight.

As shown in FIG. 8, in one embodiment, the first point cloud generator 18 functions to locate the drone 8 with its payload of the camera 16. This is for locations where the line of sight to a GNSS satellite is poor or non-existent, for example, but not limited to a covered crusher. The first point cloud generator 18 scans 140 to determine the exact position of the drone 8. The position is output 142 in a machine-readable format and is sent 144 to the computer 4, which may be any computing device, for example, but not limited to a tablet, a laptop or a mobile device. The computer 4 communicates 146 wirelessly with the drone 8 sending instructions. The drone 8 moves 148 into position based on the instructions. The camera 16 is therefore positioned in the same spatial location as during the initial calibration.

Figure 9:
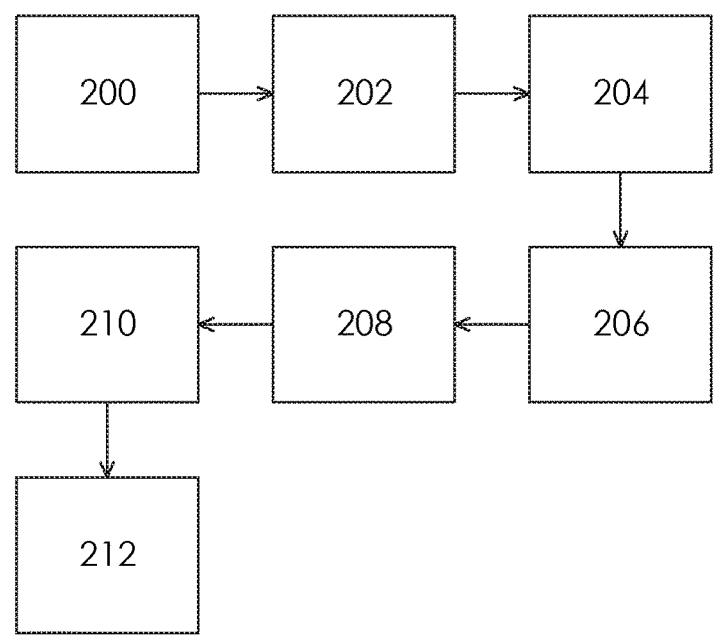
FIG. 9 is a flow chart of the method of determining the CSS.

As shown in FIG. 9, once the drone 8 is positioned, the CSS 52 or OSS 54 can be determined at any time that the crusher is clear of material, as follows. After the crusher chamber 20 has been cleared 200 of material, the laser emitter 14 is activated 202 and the camera 16 is operated 204 to take images. The camera captures at 4 frames per second, giving 20 frames per revolution of the mantle 26, as it takes 5 seconds to complete every revolution. The system 10 is programmed to capture 60 frames within approximately 15-20 seconds. The computer 4 communicates 206 with the camera 16 to receive images taken by the camera 16 that include at the CSS 52 or at the OSS 54. The computer 4 processes 208 the images and determine the length of the CSS 52 or OSS 54. If OSS is measured, then CSS 52 can optionally be calculated 210 by subtracting the average throw from the OSS 54. The data are stored 212.

Figure 10:
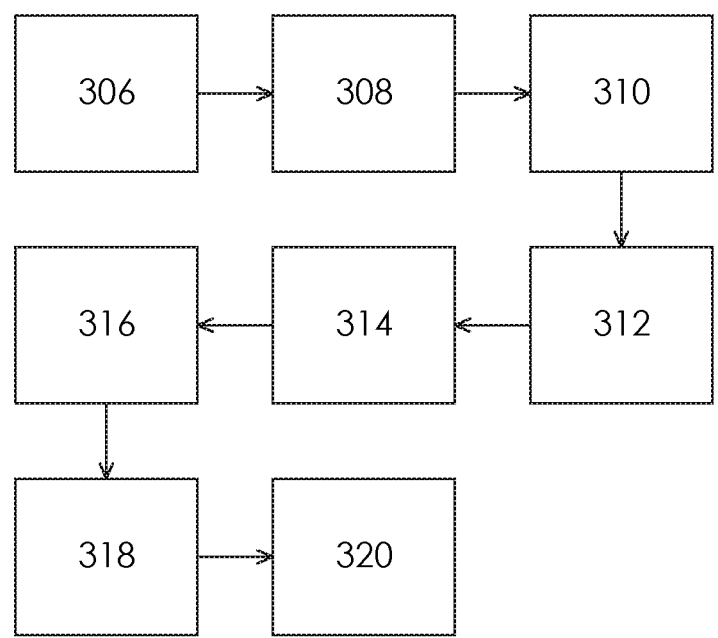
FIG. 10 is a flow chart of the details of the method.

The details of processing are shown in FIG. 10. The concave endpoint is determined by using an image processing routine to define 306 the outer edge 80 of the concave liner 38 in the image, using the offset 72 in the laser trace 78 assists in determining the outer edge 80 of the concave liner 38. Once this outer edge 80 has been located, the point on the outer edge having a pixel height corresponding in pixel height to the original concave endpoint pixel location is defined 308 as the current concave endpoint in the image. Similarly, the point on captured image having a pixel height corresponding to the pixel height of the original mantle end point pixel location is defined 310 as the current mantle endpoint in the image. Once the current mantle and concave endpoints have been located in the image, the pixel distance between the endpoints are calculated 312 to provide the width of the gap 50. Then, the conversion ratio is applied 314 to determine the actual distance of the current CSS 52 or OSS 54. If it is the OSS 54 being measured, the CSS 52 is optionally calculated 316 by subtracting the average throw from the OSS 54. Within approximately 30-35 seconds all the data are recorded 318 and a minimum gap or a maximum gap is displayed 320. As noted above, the measurements can be done at any time that the crushing chamber is cleared of rock. The mantle may be moving or stationary.

In yet another embodiment, machine vision technology is used to measure the gap width and then using the gap width, determine CSS or OSS.

Figure 11:
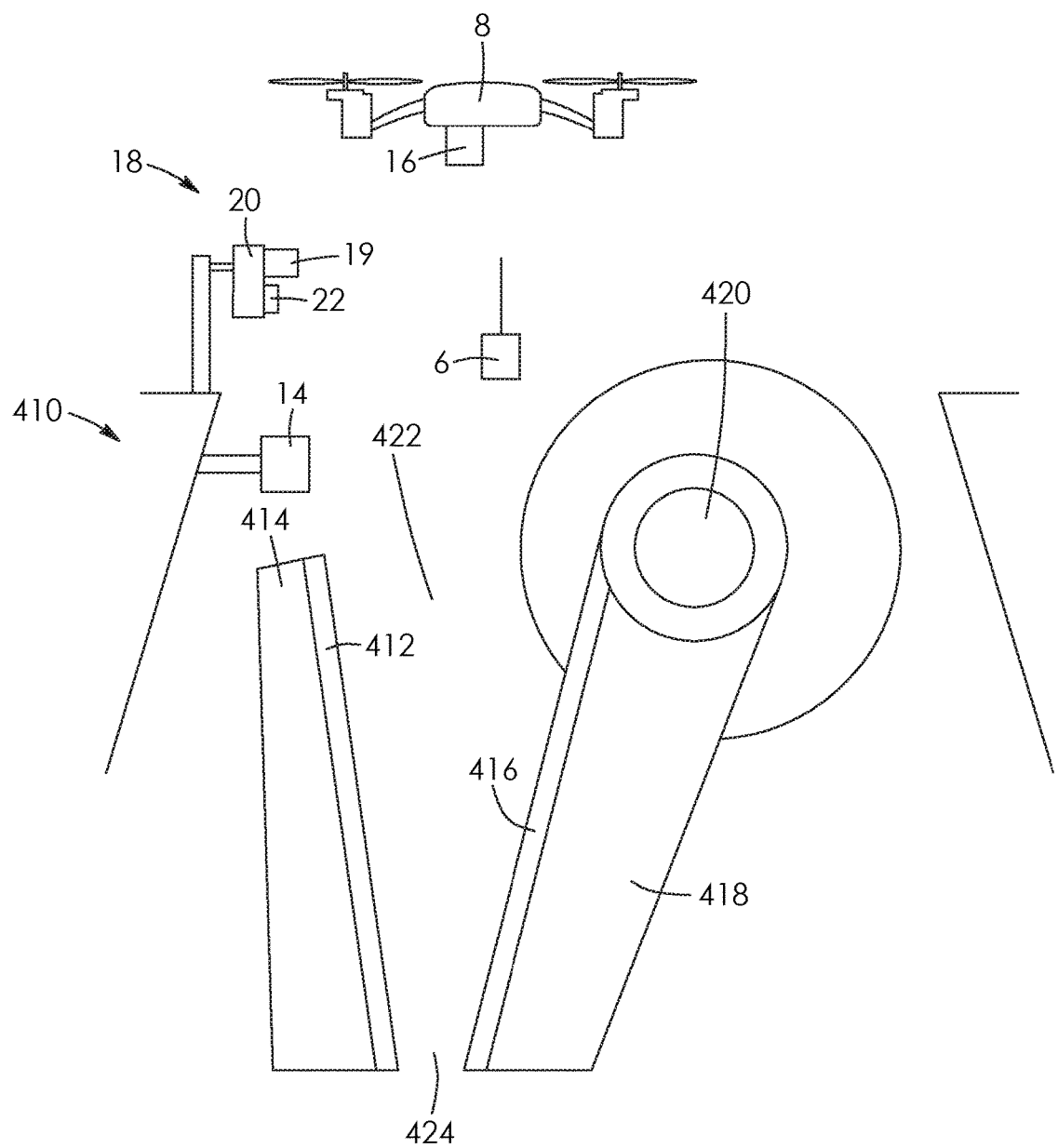
FIG. 11 is a schematic of a system for determining wear on a jaw crusher.

The system may be used for a jaw crusher, as shown in FIG. 11. The jaw crusher, generally referred to as 410 has a first jaw plate 412 on a first jaw 414 and a second jaw plate 416 on a pivoting jaw 418, and a pivot 420. The space between the plates is a crusher chamber 422. The narrowest region of the crusher chamber is the gap 424. The laser emitter 14 and camera 16 are located as described above, with the camera 16 on the drone 8 and such that the laser emitter produces a trace that bisects the pivoting jaw in a predetermined position of the pivoting jaw (again, this could be at OSS or at CSS) and the camera captures an image of the trace and an outer edge of the first jaw plate at the predetermined position of the pivoting jaw at the gap. The calibration point cloud generator functions for calibration and the RTK base station is used in positioning of the camera (on the drone) in one embodiment, and in another embodiment, the first point cloud generator 18 is used for positioning the camera, as described above for the gyratory crusher. As for the gyratory crusher, the camera communicates with the computer and the images are processed to provide a gap width and to calculate at least one of a close-side setting and an open-side setting from the gap width. This can be done as the crusher is active, as long as the crusher chamber is free of material.

EXAMPLE 1

The laser emitter on the drone has been calibrated. The drone is launched and flies above the crusher. There is an RTK base station and there is a clear line of sight to at least one GNSS satellite. The RTK base station broadcasts its location together with the code and carrier measurements to all in-view satellites. With this information, the drone equipment is able to determine its location relative to the base with high precision. By adding up the location of the base, the drone is positioned in a global coordinate framework. The computer instructs the drone to move to the predetermined position. The operator can then check the gap width in under five minutes. It is suggested that this check is done daily.

EXAMPLE 2

The drone is launched and flies above the crusher. There is either no RTK base station, or there is no reliable line of sight to a GNSS satellite. A point cloud is generated using the second three-dimensional laser and the computing device, upon receipt of the point cloud data sends instructions to the drone to position it correctly above the crusher. The operator can then check the gap width in under five minutes. It is suggested that this check is done daily.

Results are achieved when the program is operated in the absence of dust/snow/rain. Measurement is taken right after first daytime lunch break and before the crusher goes back into operation. The mantle continues to rotate.

All methods described herein can be performed in any suitable order unless otherwise indicated herein or otherwise clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Advantages of the exemplary embodiments described herein may be realized and attained by means of the instrumentalities and combinations particularly pointed out in this written description. It is to be understood that the foregoing general description and detailed description are exemplary and explanatory only and are not restrictive of the claims below. While example embodiments have been described in detail, the foregoing description is in all aspects illustrative and not restrictive. It is understood that numerous other modifications and variations can be devised without departing from the scope of the example embodiment. For example, as described, the gap width at any predetermined point in the throw of the mantle can be used to determine the OSS or CSS. Further, the above could potentially be applicable to cone crushers.

The invention claimed is:

1. A system for determining a close-side setting or an open-side setting for a gyratory crusher, wherein the gyratory crusher comprises a mantle which is eccentrically rotatable and is lined with a mantle liner, a concave lined with a concave liner, the concave housing the mantle to provide a crusher chamber, the crusher chamber having a gap, the system comprising: a laser emitter, the laser emitter positioned to mark a laser trace traversing the gap and at least intersecting the concave liner at a predetermined rotational position of the mantle to provide an offset at an outer edge of the concave liner and a second offset for identifying an outer edge of the mantle liner; a drone; a camera mounted on the drone, the camera to capture an at least one image of the laser trace and the outer edge of the concave liner at a predetermined rotational position of the mantle at the gap; a positioner, which is either a Real Time Kinematic (RTK) base station for communication with a satellite or is a first point cloud generator; a second point cloud generator for placement in the crusher chamber to generate a point cloud of the gap when calibrating the laser emitter; a computer in communication with the camera, the drone, the second point cloud generator and the first point cloud generator or the RTK base station, the computer comprising a memory and a processor, the memory providing instructions to the processor to process a position of the drone and to send instructions to the drone to correctly position the drone, the processor to process an image to provide a gap width and to calculate at least one of the close-side setting and the open-side setting from the gap width.

2. The system of claim 1, further comprising a calibration plate for placement in the crusher chamber.

3. The system of claim 1, wherein the camera is configured to capture a series of images as the mantle rotates.

4. The system of claim 3, wherein the memory stores calibration data.

5. The system of claim 4, wherein the memory provides instructions for the processor to determine wear based on the gap width.

6. The system of claim 5, wherein an RTK base station is for correctly positioning the drone.

7. A method of determining a close-side setting or an open-side setting for a gyratory crusher by measuring a gap width, wherein the gyratory crusher comprises a mantle which is eccentrically rotatable and is lined with a mantle liner, and a concave lined with a concave liner, the concave housing the mantle to provide a crusher chamber, an outer edge of the concave liner and an outer edge of the mantle liner defining a gap, the method comprising the steps of: (i) positioning a laser emitter such that it is aligned to mark a laser trace traversing the gap and intersecting the concave liner at a predetermined rotational position of the mantle to provide an offset at the outer edge of the concave liner and a second offset for identifying the outer edge of the mantle liner; (ii); determining a position of a drone carrying a machine vision system and correctly positioning the drone; and (iii) using the machine vision system that has been calibrated: capturing an image of the laser trace at the gap at a selected rotational position of the mantle; processing the image; measuring a distance between the outer edge of the mantle liner and the outer edge of the concave liner to provide the gap width; and calculating the closed-side setting or the open-side setting, thereby determining at least one of the close-side setting and the open-side setting.

8. The method of claim 7, further comprising changing one or more of the mantle and the concave.

9. The method of claim 8 further comprising recalibrating the machine vision system.

10. The method of claim 9, further comprising placing a calibration plate in the crusher chamber and using the second point cloud generator to provide a point cloud of the calibration plate.

11. The method of claim 10 wherein the mantle is rotating as the camera is capturing images.

12. The method of claim 11, the selected rotational position providing the gap at the closed-side setting.

13. The method of claim 12, the selected rotational position providing the gap at the open-side setting, the method including calculating the close-side setting from the gap width at the open-side setting.

14. A gyratory crusher combination, the gyratory crusher combination comprising: a gyratory crusher, the gyratory crusher including a mantle which is eccentrically rotatable and is lined with a mantle liner, and a concave, which is lined with a concave liner, the concave housing the mantle to provide a crusher chamber, the crusher chamber having a gap; and a system for determining a close-side setting or an open-side setting for the gyratory crusher including: a first point cloud generator proximate the gyratory crusher; a laser emitter, the laser emitter positioned to mark a laser trace traversing the gap and at least intersecting the concave liner at a predetermined rotational position of the mantle to provide a first offset at an outer edge of the mantle liner and a second offset for identifying an outer edge of the concave liner; a drone; a camera mounted on the drone to capture a series of images of the laser trace as the mantle of the gyratory crusher rotates; and a computer in communication with the camera, the first point cloud generator and the drone, the computer comprising a memory and a processor, the memory providing instructions to the processor to process a position of the drone, to send instructions to the drone to correctly position the drone, to process an image to provide a gap width and to determine at least one of the close-side setting or the open-side setting from the gap width.

15. The gyratory crusher combination of claim 14, wherein the laser emitter is a cross hair laser emitter for emitting the laser trace and a second laser trace, the laser emitter mounted to mark the second laser trace bisecting the mantle at a predetermined position of the gap.

16. The gyratory crusher combination of claim 15, wherein the predetermined position of the gap is at the close-side setting.

17. The gyratory crusher combination of claim 16, wherein a second point cloud generator is positioned to provide a point cloud of at least a portion of the mantle lining and the concave lining at the gap for calibrating the camera.

18. A system for determining a close-side setting or an open-side setting for a jaw crusher, wherein the jaw crusher comprises a first jaw plate on a first side and a second jaw plate on a pivoting jaw to provide a crusher chamber, the crusher chamber having a gap, the system comprising: a point cloud generator mounted proximate the crusher; a laser emitter, the laser emitter mounted to mark a laser trace traversing the gap at a predetermined position of the pivoting jaw; a drone; a camera mounted on the drone to capture an at least one image of the laser trace at a predetermined position of the pivoting jaw; and a computer in communication with the camera, the point cloud generator and the drone, the computer comprising a memory and a processor, the memory providing instructions to the processor to process a position of the drone, to send instructions to the drone to correctly position the drone, to process an image to provide a gap width and to determine at least one of the close-side setting or the open-side setting from the gap width.

19. A system for determining a close-side setting or an open-side setting for a gyratory crusher, wherein the gyratory crusher comprises a mantle which is eccentrically rotatable and is lined with a mantle liner, a concave lined with a concave liner, the concave housing the mantle to provide a crusher chamber, the crusher chamber having a gap, the system comprising: a laser emitter, the laser emitter positioned to provide an image of one or more of the concave liner and the mantle liner; a drone; a camera mounted on the drone, the camera to capture the image; a positioner, which is either a Real Time Kinematic (RTK) base station for communication with a satellite or is a first point cloud generator; a computer in communication with the camera, the drone, and the first point cloud generator or the RTK base station, the computer comprising a memory and a processor, the memory providing instructions to the processor to process a position of the drone and to send instructions to the drone to correctly position the drone, the processor to process an image and to calculate at least one of the close-side setting and the open-side setting from a gap width.

* * * * *